Aug. 20, 1935. H. A. BEEKHUIS, JR 2,011,704
PROCESS AND APPARATUS FOR THE VAPOR PHASE PRODUCTION OF AMMONIUM NITRATE
Filed May 7, 1930 2 Sheets-Sheet 1
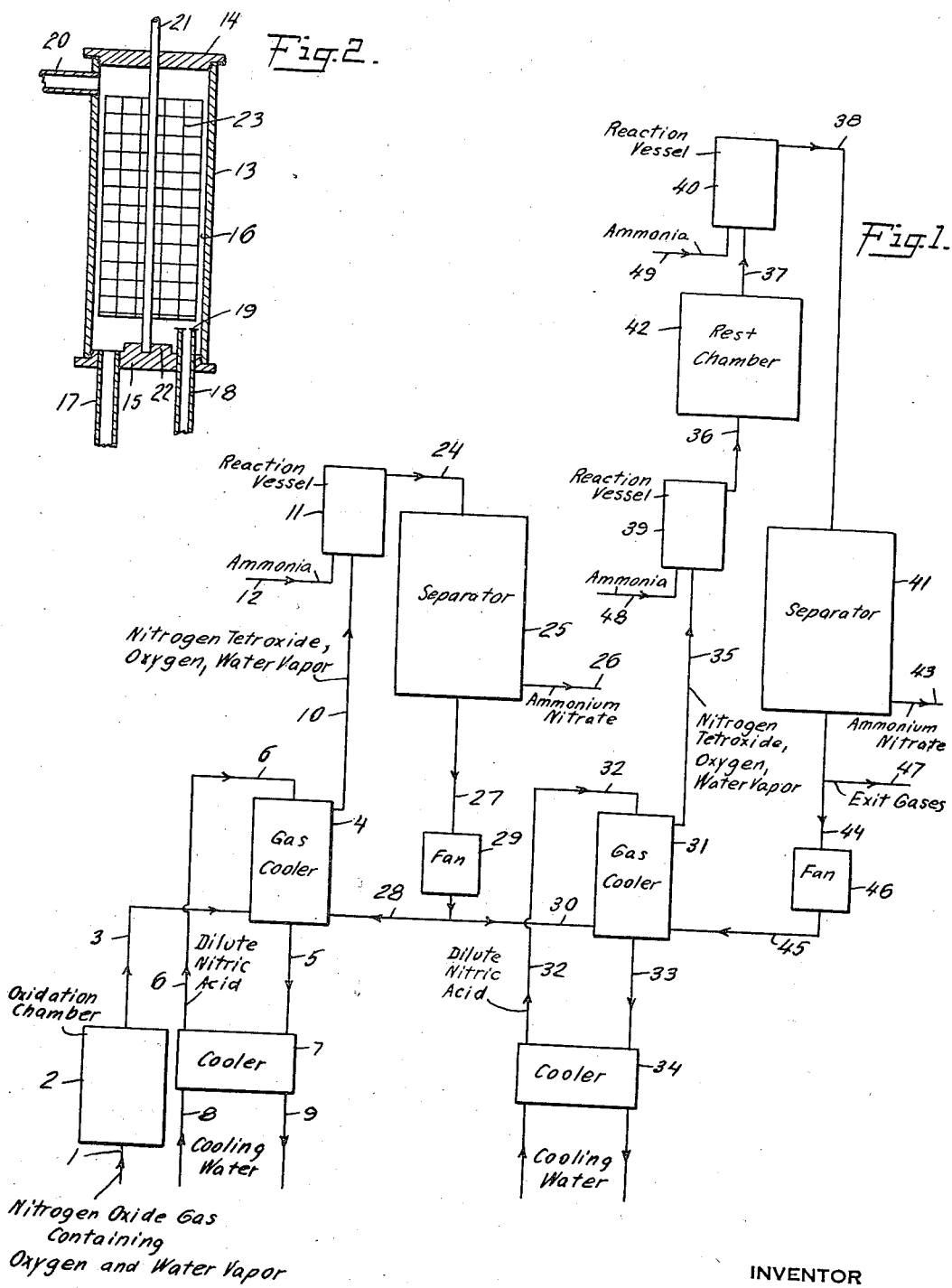
INVENTOR
HERMAN ALBERT BEEKHUIS, JR
BY
ATTORNEY Aug. 20, 1935.  H. A. BEEKHUIS, JR  2,011,704
PROCESS AND APPARATUS FOR THE VAPOR PHASE PRODUCTION OF AMMONIUM NITRATE
Filed May 7, 1930  2 Sheets-Sheet 2
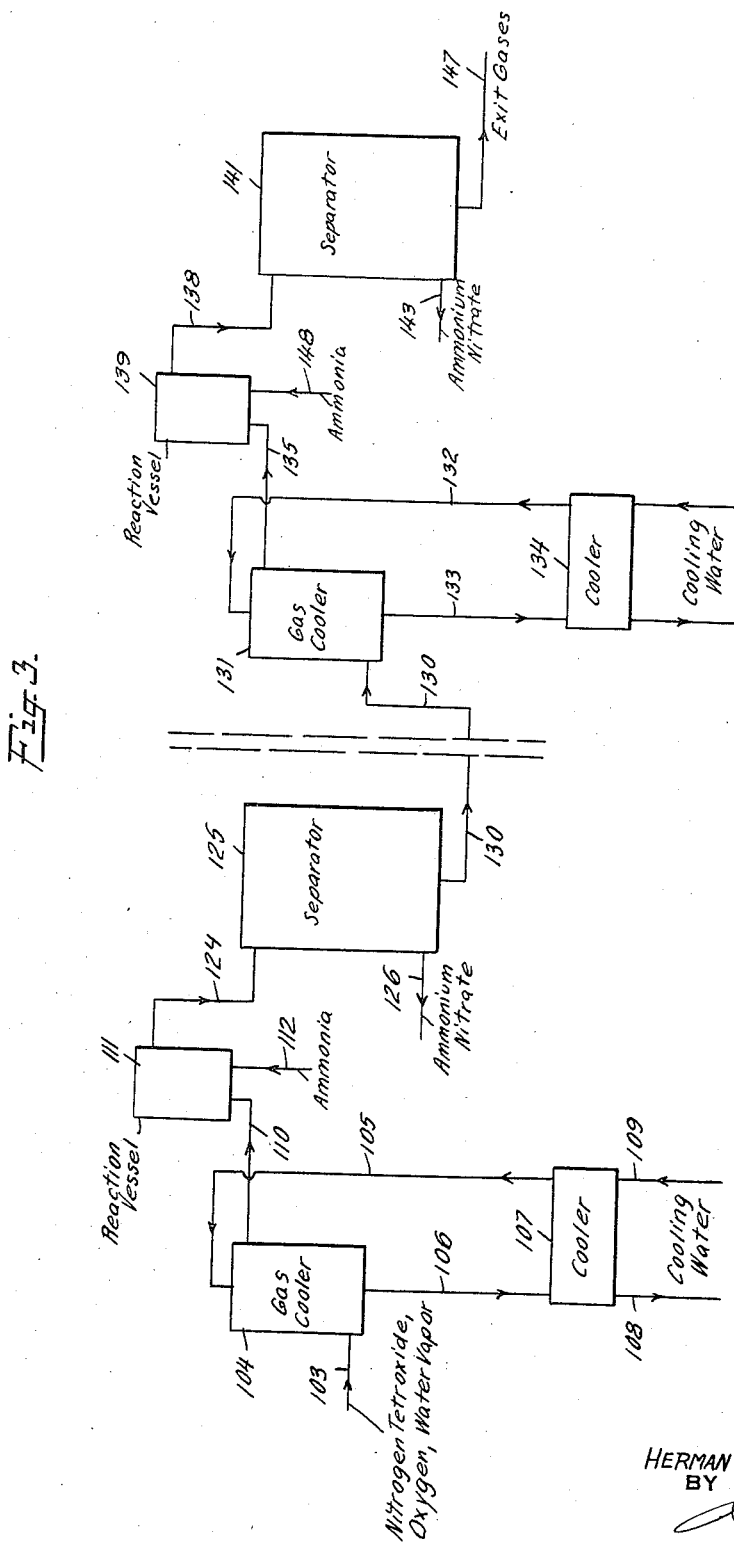
INVENTOR
HERMAN ALBERT BEEKHUIS, JR
BY
ATTORNEY Patented Aug. 20, 1935

2,011,704

UNITED STATES PATENT OFFICE 2,011,704

PROCESS AND APPARATUS FOR THE VAPOR PHASE PRODUCTION OF AMMONIUM NITRATE

Herman Albert Beekhuis, Jr., Syracuse, N. Y., assignor to Atmospheric Nitrogen Corporation, New York, N. Y., a corporation of New York Application May 7, 1930, Serial No. 450,459

47 Claims. (Cl. 23—103)

This invention relates to a process for the production of ammonium nitrate. More particularly, this invention relates to a process for the production of ammonium nitrate by reaction of ammonia, nitrogen tetroxide, water vapor and oxygen, whereby a solid ammonium nitrate product is directly obtained.

It has heretofore been proposed to produce ammonium nitrate by reaction of nitrogen tetroxide (by which term is meant nitrogen oxide corresponding to the formula $NO_2$ or $N_2O_4$ or a mixture of $NO_2$ and $N_2O_4$ in any proportions), water vapor, and oxygen with ammonia. In carrying out the process as previously proposed, a gas containing nitrogen tetroxide, oxygen and water vapor in desired proportions is mixed with a quantity of ammonia insufficient to react with the whole of the nitrogen tetroxide in accordance with the equation,

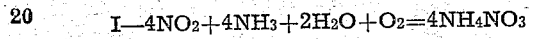
$$\text{I---}4NO_2+4NH_3+2H_2O+O_2=4NH_4NO_3$$

The solid ammonium nitrate thus formed is removed from the residual gases in which it is suspended, and a further quantity of ammonia added to react with the nitrogen tetroxide, water vapor and oxygen of the residual gases. By making several additions of ammonia to the original nitrogen tetroxide gas with intermediate removal of ammonium nitrate, the amount of nitrogen tetroxide remaining is too small to be suitable for further treatment.

Numerous difficulties are encountered in carrying out the process as described. The equation given above for the production of ammonium nitrate represents but one of several reactions which may take place simultaneously upon admixing ammonia with the nitrogen tetroxide, water vapor and oxygen. The nitrogen tetroxide gas as commercially prepared contains a quantity of nitric oxide (NO). In treating such a gas with ammonia, nitrogen and water are formed by an oxidation of the ammonia by means of the nitrogen oxides. This oxidation reaction may be expressed by the equation,

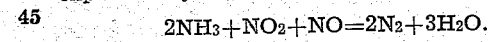
$$2NH_3+NO_2+NO=2N_2+3H_2O.$$

It is apparent that the "fixed" nitrogen of the ammonia and nitrogen oxides converted into gaseous nitrogen represents an economic loss. It has been found that even when the amount of nitric oxide present was restricted, serious losses of fixed nitrogen through its conversion into free nitrogen resulted.

Other difficulties encountered were the contamination of the ammonium nitrate product with ammonium nitrite and the decomposition of the finely divided ammonium nitrate by reason of high temperatures generated by the chemical reactions which take place.

It is an object of the present invention to provide an economic process for the direct production of ammonium nitrate by which fixed nitrogen in the form of nitrogen oxides and ammonia is efficiently transformed into ammonium nitrate. It is further, among the objects of this invention to so modify and change the several steps of prior processes for the direct production of ammonium nitrate as to result in marked improvement in the operation of such processes; to provide new conditions for carrying out the several steps of those processes; and to so correlate those steps and the conditions under which they are operated as to provide a new and economic process for the direct production of ammonium nitrate. Other objects of the invention will in part be obvious and will in part appear hereinafter.

I have discovered that ammonium nitrate may be directly produced by the interaction in the gaseous phase of ammonia with nitrogen tetroxide, oxygen and water vapor in an efficient and economic manner, and with reduced losses of fixed nitrogen. This I have accomplished by an improved coordination and correlation of the manner of introducing and admixing the ammonia with the other components; the quantities of ammonia and water vapor utilized, and the temperature at which the reaction takes place. (It is to be understood that throughout the specification and claims, when a quantity of gas is mentioned, reference is made to an amount of the gas by volume). Thus the ammonia is introduced into a gas containing the nitrogen tetroxide, oxygen and water vapor and rapidly admixed therewith by means of a specially devised mixing apparatus; the amount of ammonia is less than about 0.3 times that required to neutralize all the nitrogen tetroxide; the amount of water vapor is at least one part to each one part of ammonia, and the temperature of the reaction is maintained within the range of below about 125° C. and above the dew point of water vapor in the gas mixture.

I have found that numerous factors influence the efficiency of the reaction between ammonia, nitrogen tetroxide, water vapor, and oxygen to form ammonia and that the commercial success of a process employing that reaction is largely determined by a proper control of the conditions under which the reaction is carried out. Without in any way limiting my invention thereto, but as a possible explanation for the influence upon the efficiency of the reaction of various conditions of operation as hereinafter set forth, I have found that the data obtained for the reactions taking place upon mixing ammonia, nitrogen, tetroxide, water vapor and oxygen are in close accord with an assumption that the following equations express the chemical reactions taking place.

II—$2NO_2 + H_2O \rightleftarrows H_2N_2O_5$
III—$H_2N_2O_5 + 2NH_3 \rightarrow NH_4NO_3 + N_2 + 2H_2O$
IV—$2H_2N_2O_5 + 2NH_3 + 1/2 O_2 \rightarrow$
   $2NH_4NO_3 + H_2O + 2NO_2$ It is apparent that it is desirable to facilitate reaction IV rather than reaction III which results in the loss of "fixed" nitrogen. Equation II represents a reversible reaction, the equilibrium conditions with respect to the ratio $$\frac{[H_2N_2O_5]}{[NO_2]^2 [H_2O]}$$

being dependent upon temperature and concentration of nitrogen tetroxide and water vapor. Accordingly, while Equation IV would appear to indicate that about 50% of the nitrogen tetroxide in a gas may be efficiently utilized by the addition of ammonia, not all of the nitrogen tetroxide in the gas would be combined with water vapor as $H_2N_2O_5$ and hence in condition for reaction with ammonia. With increase in temperature a smaller proportion of nitrogen tetroxide would be in the form of $H_2N_2O_5$ and hence a smaller proportion of ammonia may efficiently react with the gas. With a relatively dilute $NO_2$ gas the proportion of $H_2N_2O_5$ is also decreased.

I have found that in mixing ammonia with a 9% $NO_2$ gas containing 4.2% water vapor at a temperature of about 50° C., the efficiency of the reaction rapidly decreased when the ammonia was added in a quantity more than about 0.3 times the amount of nitrogen tetroxide contained in the gas. On the other hand, I have found that in mixing ammonia with a gas containing about 6.0% or less of nitrogen tetroxide, it is advisable that the amount of ammonia added be less than about 0.25 times the amount required to neutralize all the nitrogen tetroxide contained in the gas.

The reaction of ammonia with nitrogen tetroxide, water vapor and oxygen, liberates a considerable amount of heat which, by elevating the temperature of the reacting gases, deleteriously influences the efficiency of the reaction. I have found that the reaction mixture should be maintained at a temperature below about 125° C. in order to prevent an excessive loss of fixed nitrogen. I have found further, that it is preferable to control the temperature by introducing the ammonia into a gas containing nitrogen tetroxide at a temperature sufficiently below 125° C. that by the introduction of a limited amount of ammonia insufficient heat is liberated by the reaction to elevate the temperature of the reaction mixture above about 125° C. By thus correlating the temperature of the nitrogen tetroxide gas and the amount of ammonia added thereto even a local excessive heating of the reaction mixture is prevented. It is possible, however, to obtain satisfactory results by providing highly efficient means for removing the heat of the reaction. When a nitrogen tetroxide gas at an elevated temperature is to be employed in the production of ammonium nitrate in accordance with my invention, the preferred method of controlling the temperature of the reaction mixture entails cooling the nitrogen tetroxide gas prior to the introduction thereto of a limited quantity of ammonia.

An association of the nitrogen tetroxide and water vapor as indicated by Equation II above, prior to its reaction with ammonia, would seem to be necessary for high efficiency of the reaction to form ammonium nitrate. The nitrogen tetroxide gas, prior to introduction of ammonia thereto, should contain a quantity of water vapor at least equal to the amount of ammonia introduced thereto. I have found that it is preferable for economic operation of the process to regulate the amount of water vapor with relation to the nitrogen tetroxide content of the gas and that a suitable proportion is between 0.5 and 2.5 or more parts of water vapor to every 1 part of $NO_2$, but in no case should there be a sufficient amount to form a liquid condensate in the gas with which the ammonia is mixed. It is apparent, therefore, that the amount of excess water vapor which may be employed is dependent upon the temperature of operation, and the gases, prior to the introduction of ammonia, should be at a temperature above the dew point of the water vapor contained therein. If the formation of a liquid condensate occurs, corrosion of the apparatus in which the gas is treated results. Furthermore, I have found that the presence of such a condensate in the gases into which ammonia is introduced results in an undesirable moisture content of the ammonium nitrate product, and what is still more serious, results in a contamination of the product with ammonium nitrite and other impurities.

I have further discovered that the concentration of the nitrogen tetroxide in the reaction mixture of gases plays an important role in the efficiency of the reaction to form ammonium nitrate. Equation II above may serve to explain this discovery. As has already been stated, the results obtained by this invention indicate that the reaction between nitrogen tetroxide, water vapor, oxygen, and ammonia takes place in two stages; first, the formation of the compound $H_2N_2O_5$ and the reaction of ammonia with this product. The formation of $H_2N_2O_5$ would appear to occur as the result of the reversible reaction represented by Equation II above and the amount of $H_2N_2O_5$ present in a mixture of gases may be represented by the equilibrium equation for this reaction, $$[NO_2]^2 [H_2O] = K[H_2N_2O_5]$$

This interpretation of the chemistry of the process serves to explain my discovery that the nitrogen tetroxide and water vapor should not be too highly diluted in the gaseous reaction mixture since an excessive dilution not only requires the treatment of unnecessarily large amounts of gas but exercises a deleterious influence upon the reaction to form ammonium nitrate. I have found that it is preferable to admix a concentrated ammonia gas with the nitrogen tetroxide gas, avoiding thereby an unnecessary dilution of the reaction mixture of gases. While an excess of oxygen over the amount required for the reaction to form ammonium nitrate should be present, any unduly large excess is to be avoided because of the dilution of the nitrogen tetroxide thereby. I have found it preferable, therefore, to limit the amount of oxygen in the reaction mixture to an amount not greater than about 10% of the total volume of the gas with which the ammonia is admixed.

I have discovered further, that a very rapid mixing of the ammonia with the nitrogen tetroxide, water vapor and oxygen, is necessary for their efficient conversion into ammonium nitrate. The desirability of rapid mixing is indicated by a comparison of Equations III and IV above. The reactions represented by these equations take place with great rapidity so that if in the mixture of gases there be a localized excess of ammonia, the reaction of Equation III resulting in a loss of fixed nitrogen takes place where the excess of ammonia exists even for a very short period of time.

Furthermore, I have found that it is important that the ammonia should be introduced into a gas containing nitrogen tetroxide, water vapor and oxygen, and that the nitrogen oxides should be relatively completely oxidized to nitrogen tetroxide prior to the introduction of ammonia, for example the state of oxidation of the nitrogen oxide gas is preferably such that 80% or more of the nitrogen oxides are present as $NO_2$.

My invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of my invention, reference should be had to the following detailed description taken in connection with the accompanying drawings, in which:

Fig. 1 is a diagrammatic representation of the process of this invention as carried out in one type of apparatus;

Fig. 2 is an elevation, in cross-section, of the reaction vessels of Fig. 1; and Fig. 3 is a diagrammatic representation of the process of this invention as carried out in a different type of apparatus from that illustrated in Fig. 1.

Referring now to Fig. 1, a nitrogen oxide gas such as is obtained from the heat exchangers and coolers of an ammonia oxidation system, which contains oxygen and a relatively large amount of water vapor, is passed through a pipe 1 into an oxidation chamber 2 where the nitrogen oxides are oxidized to nitrogen tetroxide, and the resulting gas containing nitrogen tetroxide, water vapor and oxygen, leaves chamber 2 through a pipe 3. It is apparent that a nitrogen oxide gas from a source other than an ammonia oxidation system, may be passed into chamber 2 for treatment therein, or if a gas of the proper composition is available, the treatment in chamber 2 may be omitted and the gas passed directly through pipe 3 for use as hereinafter described. The gas passed through pipe 3 preferably contains about 80% of its content of nitrogen oxides as nitrogen tetroxide. It should also contain a quantity of oxygen sufficient for the production of ammonium nitrate in accordance with Equation I above. If the gas passed into chamber 2 contains insufficient oxygen for the oxidation of the nitrogen oxides, additional oxygen may be admixed therewith prior to their passage into chamber 2 and if required to make up for any deficiency in the amount of free oxygen with respect to the desired proportion of oxygen and nitrogen tetroxide, oxygen may be added to the gases passing through pipe 3.

From pipe 3 the gases are passed into the bottom of a gas cooler 4 wherein they mingle with residual gas from a pipe 28 and are intimately contacted with an aqueous medium having a predetermined composition and temperature, preferably a solution of nitric acid, introduced into the top of the cooler from a pipe 6. Cooler 4 preferably contains a packing material which ensures intimate contact between the gases passed through the cooler and the nitric acid solution introduced therein. The nitric acid after contacting with the gas is withdrawn from the bottom of cooler 4 through a pipe 5, and is circulated through a cooler 7 in indirect contact with a cooling medium such as water, back to the top of cooler 4 for renewed contact with gas from pipe 3. The cooling water is introduced into cooler 7 from a pipe 8 and withdrawn therefrom through a pipe 9. By its contact in cooler 4 with cool dilute nitric acid, the gas from pipe 3 is cooled to a desired temperature and its water vapor content is adjusted either by taking up from the nitric acid a quantity of water corresponding to saturation of the gas under the conditions of temperature and concentration of the acid, or if the gas from pipe 3 contains an excess of water vapor above that corresponding to saturation in contact with the nitric acid in cooler 4, the excess water vapor condenses out of the gas. The nitric acid solution likewise may absorb nitrogen oxides from the gas which react to form nitric acid and in such a case in order to maintain a constant composition of cooling acid in cooler 4 either a portion of the acid may be withdrawn during its circulation or a quantity of water added thereto as may be desirable.

The cooling of the nitrogen tetroxide gas may be accomplished in other manners than that described, for example by passing the gas in indirect heat exchange with a cooling medium. By employing direct cooling with aqueous nitric acid, however, simultaneously with the cooling of the gas its water vapor content is adjusted by controlling the concentration of the acid and the temperature of cooling. Furthermore, I have discovered that an acid of proper concentration does not remove from a gas contacted therewith finely divided particles of solid ammonium nitrate. The residual gas introduced into cooler 4 carries with it a small amount of suspended solid ammonium nitrate. This ammonium nitrate not only does not interfere with the cooling of the gases, as it would in case the heat transfer were through metal surfaces upon which the ammonium nitrate would deposit, but also the ammonium nitrate in large part passes with the gases through the cooler and may be recovered along with additional ammonium nitrate subsequently formed and recovered as described below.

The gas passed through cooler 4 is withdrawn through a pipe 10 and passed to a reaction vessel 11 where it is admixed with ammonia from a pipe 12. The amount of ammonia introduced into reaction vessel 11 is proportioned with respect to the amount of nitrogen tetroxide introduced thereto such that the amount of ammonia in the reaction mixture of gases is less than about 0.3 times, and for example, employing a gas containing between 5 and 6% of nitrogen tetroxide, is preferably between about 0.10 and 0.25 times the amount required to neutralize all of the nitrogen tetroxide. The ammonia, nitrogen tetroxide, oxygen and water vapor react to form ammonium nitrate which is suspended as a finely divided solid in the gases leaving reaction vessel 11. As a result of this reaction to form ammonium nitrate, considerable quantities of heat are liberated. The temperature attained by the reacting gases as a result of this liberation of heat should be limited to a temperature below about 125° C. As noted above, the temperature of the reacting gases is preferably maintained throughout the course of the reaction below this temperature of 125° C. by so correlating the degree of cooling of the nitrogen tetroxide gas in gas cooler 4 and the amount of ammonia admixed therewith in the reaction vessel that insufficient heat is liberated by the reaction to raise the temperature of the cooled gases above 125° C. It is important, however, that the nitrogen tetroxide gas be not cooled in gas cooler 4 to such a low temperature that the water vapor content, which is limited by the temperature of the gas, would be less than about 1 part of water vapor for every one part of ammonia subsequently added thereto. It has been found that a process may be satisfactorily operated when a gas containing not more than about 6.5% nitrogen tetroxide in passing through gas cooler 4 is cooled to a temperature of about 40° C. and the reacting gases in reaction vessel 11 are maintained throughout the course of the reaction at temperatures between about 40° C. and 125° C. Under such conditions, by employing in gas cooler 4 an aqueous solution of nitric acid containing about 50% $HNO_3$ at about 40° C., the nitrogen tetroxide gas may be cooled to an appropriate temperature and its water vapor content automatically regulated either by the gas taking up the proper amount of moisture from the acid or giving up to the acid any undesirable excess of water vapor which it may contain. If an aqueous medium other than a nitric acid solution is employed in the cooling of the gas, it is apparent that the moisture content of the gas may likewise be regulated by controlling the temperature and concentration of such aqueous medium.

It is of importance that the ammonia be introduced in reaction vessel 11 into the nitrogen tetroxide gas containing oxygen and water vapor and be quickly and thoroughly admixed with this gas. In Fig. 2 is shown one type of reaction vessel which has been found to be suitable for carrying out the reaction. In that figure, the numeral 13 designates a casing provided with closures 14 and 15, which together, define a mixing and reaction chamber 16. A pipe 17, which corresponds to pipe 10 of Fig. 1, opens through closure 15 into chamber 16 and serves for the introduction into chamber 16 of the nitrogen tetroxide, oxygen and water vapor gas. A second pipe 18 serving for the introduction of ammonia into chamber 16, passes through closure 15 and terminates in a restricted orifice formed in a plate 19 seated on the end of pipe 18 within chamber 16. Adjacent the opposite end of casing 13 a pipe 20 which opens through casing 13 into chamber 16 is provided for removing the unreacted gases and the reaction products from chamber 16. A rotatable shaft 21 has one end seated in a bearing 22 carried by closure 15 and extends through closure 14 by way of a gas-tight joint to a point without the reaction vessel. Means not shown in Fig. 2 are provided for rapidly rotating shaft 21. Shaft 21 within reaction chamber 16 carries a grid 23 which is attached to the shaft for rotation therewith. By rapidly rotating shaft 21 and grid 23, a turbulence is mechanically imparted to the stream of nitrogen tetroxide gas passing through reaction chamber 16. The ammonia is introduced as a restricted stream flowing through the orifice in plate 19 into the turbulently flowing stream of nitrogen tetroxide gas, and is rapidly and thoroughly admixed with the nitrogen tetroxide, oxygen and water vapor, with which it reacts to form ammonium nitrate.

Referring now to Fig. 1, the gases leaving reaction vessel 11 carry with them the ammonium nitrate produced therein and pass through a pipe 24 to a separator 25 wherein the solid ammonium nitrate is separated from the gas stream and removed through a pipe 26. Separator 25 may be of any desired type such as a centrifugal, baffle or electrostatic separator. The gases from which the ammonium nitrate has been in large part removed are passed through a pipe 27 and in part are returned through a pipe 28 to gas cooler 4 for renewed treatment therein and subsequent reaction with ammonia in reaction vessel 11 to form additional quantities of ammonium nitrate. The recirculation of the gases from separator 25 is induced by a fan 29.

A portion of the residual gas containing nitrogen tetroxide, oxygen and water vapor from separator 25 passing through pipes 27 and 28 is bled from the circulatory system above described and passed through a pipe 30 to a second circulatory system wherein ammonium nitrate is produced therefrom in a manner similar to the treatment of the nitrogen tetroxide, oxygen and water vapor gas from pipe 3. This second circulatory system comprises a gas cooler 31, cooler 34, reaction vessels 39 and 40 and a separator 41, which may be of the same type as the corresponding portions of the circulatory system above described. In gas cooler 31 the gas from pipe 30 is cooled and its water vapor content adjusted by direct contact with dilute nitric acid passed into cooler 31 from a pipe 32. After contact with the gas the nitric acid is withdrawn from cooler 31 through a pipe 33, passed through a cooler 34, where it is cooled by means of cooling water, and is recirculated to cooler 31 through pipe 32. As in the case of the gas in cooler 4, it is preferred to cool the gas in cooler 31 to a temperature of about 40° C. The thus cooled gas is passed by way of pipes 35, 36, 37 and 38 through reaction vessels 39 and 40, wherein they are treated with ammonia to produce ammonium nitrate and thence to separator 41 where the ammonium nitrate is removed from the residual unreacted gas. As shown in the drawings, the gas from reaction vessel 39 passes through a rest chamber 42 before entering reaction vessel 40. From separator 41 the ammonium nitrate produced in reaction vessels 39 and 40 is removed through a pipe 43 and residual gas returned through pipes 44 and 45 to cooler 31 by means of a fan 46. A portion of the gas is discharged from the system through a pipe 47 and may, if desired, be treated to recover the residual relatively small amount of nitrogen oxides contained therein or otherwise disposed of.

The heat liberated by the formation of ammonium nitrate in reaction vessels 39 and 40 is removed from the gas by dissipation during passage from these vessels to gas cooler 31 and in gas cooler 31 by contact with cooled dilute nitric acid. The content of water vapor, nitrogen tetroxide and oxygen of the residual gas is adjusted in cooler 31 by direct contact of dilute nitric acid therewith and by admixture with the gas from pipe 30. The thus treated gas in reaction vessel 39 is mixed in reaction vessels 39 and 40 with ammonia from pipes 48 and 49 respectively. In each reaction vessel an amount of ammonia is admixed with the nitrogen tetroxide gas such that in each of the reaction vessels, the amount of ammonia in the reaction mixture is less than about 0.3 times and is preferably less than about 0.25 times the amount required to neutralize all of the nitrogen tetroxide therein. The use of two reaction vessels, 39 and 40, in series is advantageous when the nitrogen tetroxide concentration in the gas is low, for example about 2% $NO_2$. In such case the temperature of the gases leaving reaction vessel 39 is sufficiently low that a further quantity of ammonia may be added in reaction vessel 40 and a temperature of 125° C. not exceeded. Thus, there may be introduced into vessel 39 an amount of ammonia about 0.25 times the amount required to neutralize all of the nitrogen tetroxide passed into the vessel and a like amount of ammonia may be introduced into vessel 40. Intermediate the two reaction vessels 39 and 40 the gas containing ammonium nitrate formed in reaction vessel 39 passes through rest chamber 42 where it is maintained for a period of time in a relatively quiescent condition to permit further oxidation of lower oxides of nitrogen contained in the gas and the readjustment of the equilibrium between the nitrogen tetroxide and water vapor and $H_2N_2O_5$ formed by their combination. If desired, however, the gas from the reaction vessel 39 may be passed directly to reaction vessel 40.

The process for the production of ammonium nitrate as carried out in the apparatus diagrammatically illustrated in Fig. 1 comprises the treatment of a gas containing nitrogen tetroxide, oxygen and water vapor in two circulatory systems. In the first of these systems, which comprises gas cooler 4, reaction vessel 11, separator 25 and fan 29, during the circulation of the gas, successive additions of ammonia are admixed therewith in reaction vessel 11 to produce ammonium nitrate which is separated from the residual gas in separator 25. The heat liberated by the reaction in vessel 11 is removed from the circulatory system by dissipation to the surrounding air in the travel of gases from the reaction vessel back to the gas cooler and by contacting the gases in cooler 4 with the cool dilute nitric acid passing therethrough. The nitrogen tetroxide, oxygen and water vapor content of the recirculating gases is adjusted by treatment with the dilute nitric acid and by addition of fresh gases from pipe 3 and the recirculating gases then pass to reaction vessel 11 for admixture therewith of ammonia.

The following conditions are illustrative of one embodiment of my invention, but it is to be understood that the invention is in no wise limited to the conditions specifically set forth. A gas from the heat exchangers of an ammonia oxidation system containing about 9% nitrogen oxides calculated as $NO_2$, about 2 to 4% water vapor and about 1 to 5% oxygen may be treated in oxidation chamber 2 to oxidize the lower oxides of nitrogen to nitrogen tetroxide and thence passed at a temperature of, for example, about 100° C., to gas cooler 4 where it is cooled to an appropriate temperature by direct contact with dilute nitric acid. The gas passed into the cooler may be admixed therein with about four times its volume of residual gas from pipe 28. The gas leaving the cooler through pipe 10 may contain about 5% to 6% $NO_2$, 2 to 4% $H_2O$ and 1 to 5% $O_2$. In reaction vessel 11 it is admixed with about 0.01 times its volume of substantially pure ammonia gas. The gas leaving reaction vessel 11, after separation of the ammonium nitrate in separator 25, is divided and four-fifths may be returned to gas cooler 4 and the remaining one-fifth passed to gas cooler 31.

The second circulatory system comprises gas cooler 31, reaction vessels 39 and 40, rest chamber 42, separator 41 and fan 46. In this system, gas entering the gas cooler from pipe 30 may be admixed with about four times its volume of residual gas from pipe 45 and the gas mixture cooled to about 40° C. by direct contact with dilute nitric acid. The gas leaving cooler 31 may be admixed with about 0.004 times its volume of ammonia from pipe 48. Ammonium nitrate is formed and, together with the residual gas, passes through rest chamber 42 to reaction vessel 40. The gas passed to reaction vessel 40 may have a temperature of about 70° C. and is admixed with about 0.003 times its volume of ammonia from pipe 49. Additional ammonium nitrate is formed and the temperature of the gas leaving reaction vessel 40 rises to about 95° C. The ammonium nitrate produced in reaction vessels 39 and 40 is removed in separator 41. The residual gas contains about 1% $NO_2$. About four-fifths of the residual gas is recirculated to the gas cooler 31, while about one-fifth is discharged from pipe 47.

In Fig. 3, there is diagrammatically illustrated a process for the production of ammonium nitrate in accordance with this invention in which the nitrogen tetroxide gas is treated in series without recirculation of the residual unreacted gases. The apparatus of this figure consists of two similar groups, each group comprising a gas cooler 104 or 131, a nitric acid cooler 107 or 134, reaction vessel 111 or 139, and separator 125 or 141 which may be of the same type as the corresponding portions of the apparatus of Fig. 1. Although in Fig. 3 an apparatus is illustrated consisting of two groups, it is to be understood that one or more additional groups may be employed as may be desired.

In employing the apparatus of Fig. 3, a gas corresponding, for example, to the gas passed to gas cooler 4 of the apparatus of Fig. 1 is passed through pipe 103 to a gas cooler 104 where it is cooled by direct contact with dilute nitric acid from pipe 105. After contact with the gas the dilute nitric acid is passed through pipe 106 to cooler 107 where it is cooled by means of cooling water circulated therethrough by way of pipes 108 and 109 and returned through pipe 105 to the gas cooler. The cooled nitrogen tetroxide gas containing oxygen and water vapor passes from gas cooler 104 through a pipe 110 to reaction vessel 111 where it is admixed with ammonia from a pipe 112. The ammonium nitrate and residual gases pass through a pipe 124 to separator 125 in which the ammonium nitrate is removed from the gas and is withdrawn through a pipe 126. The residual gas passes through a pipe 130 to gas cooler 131 of the succeeding group for treatment in the apparatus of that group for the production of additional ammonium nitrate. In gas cooler 131 the residual gases are cooled and their water vapor content adjusted by direct contact with dilute nitric acid from pipe 132. The dilute nitric acid, after contact with the gas, is passed through pipe 133 to cooler 134 where it is cooled by means of cooling water and recirculated through pipe 132 back to gas cooler 131. The thus treated residual gas passes through pipe 135 to reaction vessel 139 where it is admixed with ammonia from pipe 148. The ammonium nitrate and unreacted gases pass through pipe 138 to separator 141 where the ammonium nitrate is separated out and withdrawn through a pipe 143. The residual gas is discharged through a pipe 147 for treatment to recover its remaining content of nitrogen oxides or disposed of in any desired manner.

The production of ammonium nitrate in accordance with this modification of my invention, comprises forming in each of reaction vessels 111 and 139 a mixture of gases containing nitrogen tetroxide, oxygen, water vapor and ammonia in such proportions that the amount of ammonia is less than about 0.3 times the amount required to neutralize all the nitrogen tetroxide in the admixture. The nitrogen oxide gases passed to the reaction vessels are cooled in gas cooler 104 or 131 to a temperature which may be about 40° C. whereby the temperature of the gases in reaction vessels 111 and 139 is not increased to above about 125° C. by the heat liberated by the reaction to form ammonium nitrate. In both of the gas coolers the nitrogen tetroxide and oxygen gas is simultaneously cooled and its water vapor content adjusted by direct contact with aqueous nitric acid.

The above described examples of processes for the production of ammonium nitrate embodying this invention, comprise admixing in reaction vessels 11, 39 and 40 or 111 and 139 a plurality of successive additions of ammonia with a gas containing nitrogen tetroxide, oxygen and water vapor. The nitrogen tetroxide gas is cooled in gas coolers 4, 31, 104 or 131 prior to the introduction of ammonia, and the quantity of each addition of ammonia is limited to an amount insufficient to completely neutralize the nitrogen tetroxide in the gas with which it is admixed which, in the particular processes described, is preferably between about 0.1 and 0.25 times that required to neutralize all of the nitrogen tetroxide admixed therewith. The temperature of the reaction mixture in each of vessels 11, 39, 40, 111 and 139 is maintained below about 125° C. by correlating the degree of cooling of the nitrogen tetroxide gas and the amount of ammonia admixed with the cooled gas.

Since certain changes in carrying out the above processes and in the constructions set forth which embody the invention may be made without departing from its scope, it is intended that all matter contained in the above description or shown in the accompanying drawings shall be interpreted as illustrative and not in a limiting sense.

I claim:

1. In the process of producing ammonium nitrate by reaction of ammonia, water vapor, nitrogen tetroxide and oxygen, that improvement which comprises forming a mixture of said gases in proportions such that the amount of ammonia in said mixture is less than about 0.3 times the amount required to neutralize all of the nitrogen tetroxide therein.

2. In the process of producing ammonium nitrate by reaction of ammonia, water vapor, nitrogen tetroxide and oxygen, that improvement which comprises forming a mixture of said gases in proportions such that the amount of ammonia in said mixture is less than about 0.25 times the amount required to neutralize all of the nitrogen tetroxide therein.

3. In the process of producing ammonium nitrate by reaction of ammonia, water vapor, nitrogen tetroxide and oxygen, that improvement which comprises maintaining the temperature of said gases throughout the course of the reaction below about 125° C.

4. In the process of producing ammonium nitrate by reaction of ammonia, water vapor, nitrogen tetroxide and oxygen, that improvement which comprises mixing said gases and maintaining the temperature of said mixed gases throughout the course of the reaction below about 125° C. and above the dew point of the water vapor in said mixture.

5. In the process of producing ammonium nitrate by reaction of ammonia, water vapor, nitrogen tetroxide and oxygen, that improvement which comprises maintaining said gases throughout the course of the reaction at temperatures between about 40° C. to 125° C.

6. The process of producing ammonium nitrate which comprises admixing ammonia with a gas containing nitrogen tetroxide, oxygen and water vapor, limiting the quantity of said ammonia to an amount insufficient to neutralize all the nitrogen tetroxide contained in said gas, and maintaining said mixture throughout the course of the reaction at a temperature below about 125° C.

7. The process of producing ammonium nitrate which comprises admixing ammonia with a gas containing nitrogen tetroxide, oxygen and water vapor, limiting the quantity of said ammonia to an amount insufficient to neutralize all the nitrogen tetroxide contained in said gas, and maintaining said mixture throughout the course of the reaction at a temperature above the dew point of the water vapor in the mixture and below about 125° C.

8. The process of producing ammonium nitrate which comprises admixing ammonia with a gas containing nitrogen tetroxide, oxygen and water vapor and limiting the quantity of the ammonia to an amount such that the heat liberated by reaction of the ammonia with said gas is insufficient to heat the reaction mixture to a temperature above about 125° C.

9. The process of producing ammonium nitrate which comprises introducing ammonia into a cooled gas mixture containing nitrogen tetroxide, oxygen and water vapor and correlating the temperature to which said mixture is cooled and the quantity of ammonia added thereto whereby the reaction mixture is heated to a temperature below about 125° C. by the heat liberated by reaction of said ammonia with the gas mixture.

10. The process of producing ammonium nitrate which comprises introducing ammonia into a cooled gas mixture containing nitrogen tetroxide, oxygen and water vapor, correlating the temperature to which said mixture is cooled and the quantity of ammonia added thereto whereby the reaction mixture is heated to a temperature below about 125° C. by the heat liberated by reaction of said ammonia with the gas mixture, separating ammonium nitrate thus produced from the residual gas, cooling the residual gas and adjusting its content of nitrogen tetroxide, oxygen and water vapor to produce a gas mixture having substantially the same composition as the aforesaid cooled gas mixture and employing the resulting cooled gas mixture for the production of ammonium nitrate in the manner hereinbefore described.

11. The process of producing ammonium nitrate which comprises introducing ammonia into a gas mixture containing nitrogen tetroxide, oxygen and water vapor at a temperature of about 40° C., limiting the quantity of the ammonia to an amount such that the heat liberated by reaction of the ammonia with said gas mixture is insufficient to heat the reaction mixture to a temperature above about 125° C., separating ammonium nitrate thus produced from the residual gas, adjusting the content of nitrogen tetroxide, oxygen and water vapor of the residual gas and removing heat therefrom to produce a gas mixture having substantially the same composition and temperature as the first mentioned gas mixture, and employing the resulting gas mixture for the production of ammonium nitrate in the manner hereinbefore described.

12. In the process of producing ammonium nitrate by reaction of ammonia, water vapor, nitrogen tetroxide and oxygen, that improvement which comprises cooling a gas containing nitrogen tetroxide by directly contacting said gas with an aqueous nitric acid solution and mixing ammonia with the thus cooled gas.

13. In the process of producing ammonium nitrate by reaction of ammonia, water vapor, nitrogen tetroxide and oxygen, that improvement which comprises cooling a gas containing nitrogen tetroxide by directly contacting said gas with an aqueous medium and mixing ammonia with the thus cooled gas.

14. In the process of producing ammonium nitrate by reaction of ammonia, water vapor, nitrogen tetroxide and oxygen, that improvement which comprises simultaneously cooling and adjusting the water vapor content of a gas containing nitrogen tetroxide and oxygen by directly contacting said gas with an aqueous nitric acid solution having a predetermined composition and temperature and mixing ammonia with the thus cooled gas.

15. The process of producing ammonium nitrate which comprises simultaneously cooling and adjusting the water vapor content of a gas containing oxygen and not more than about 6.5% nitrogen tetroxide by directly contacting said gas with about 50% aqueous nitric acid solution at a temperature of about 40° C., and introducing ammonia into the thus cooled gas.

16. The process of producing ammonium nitrate which comprises simultaneously cooling and adjusting the water vapor content of a gas containing nitrogen tetroxide and oxygen by directly contacting said gas with an aqueous nitric acid solution having a predetermined composition and temperature, introducing ammonia into the thus cooled gas in amount insufficient to completely neutralize all of the nitrogen tetroxide therein to form ammonium nitrate, separating the residual gas and ammonium nitrate thus produced, introducing into the residual gas nitrogen tetroxide and oxygen, cooling and adjusting the water vapor content of this gas by directly contacting it with aqueous nitric acid to produce a gas mixture having substantially the same composition and temperature as the aforesaid cooled gas, and employing the resulting cooled gas mixture for the production of ammonium nitrate in the manner hereinbefore described.

17. The process of producing ammonium nitrate which comprises introducing successive additions of ammonia into a gas containing nitrogen tetroxide, oxygen and water vapor, limiting the quantity of each addition of ammonia to an amount less than about 0.3 times that required to completely neutralize all of the nitrogen tetroxide in the gas into which said addition is introduced, separating ammonium nitrate formed from the residual gas, and cooling the gas prior to addition of ammonia thereto to a predetermined temperature whereby the heat liberated by the reaction of the ammonia with the thus cooled gas is insufficient to heat the reaction mixture to a temperature above about 125° C.

18. The process of producing ammonium nitrate which comprises introducing successive additions of ammonia into a gas containing nitrogen tetroxide, oxygen and water vapor, limiting the quantity of each addition of ammonia to an amount less than about 0.25 times that required to completely neutralize all of the nitrogen tetroxide in the gas into which said addition is introduced, separating ammonium nitrate formed from the residual gas, cooling the gas prior to addition of ammonia thereto to about 40° C., and maintaining the temperature of the reaction mixture formed by each of said additions of ammonia between about 40° C. and 125° C.

19. In the process of producing ammonium nitrate by reaction in the gaseous phase of ammonia, water, nitrogen tetroxide and oxygen, that improvement which comprises reacting on said nitrogen tetroxide, oxygen and water vapor with ammonia in a plurality of stages and limiting the quantity of ammonia available for reaction with the nitrogen tetroxide in each stage to not more than about 0.3 times the amount required to neutralize all of said nitrogen tetroxide in each stage to form ammonium nitrate.

20. In the process of producing ammonium nitrate by reaction in the gaseous phase of ammonia, water, nitrogen tetroxide and oxygen, that improvement which comprises reacting on said nitrogen tetroxide, oxygen and water vapor with ammonia in a plurality of stages, and limiting the quantity of ammonia available for reaction with the nitrogen tetroxide in each stage to less than about 0.25 times the amount required to neutralize all of said nitrogen tetroxide in each stage to form ammonium nitrate.

21. The process for the production of ammonium nitrate which comprises circulating a gas containing nitrogen tetroxide, oxygen and water vapor in a circulatory system and during the circulation of said gas admixing therewith ammonia whereby ammonium nitrate is produced, limiting the quantity of said ammonia to an amount less than about 0.3 times that required to neutralize all the nitrogen tetroxide in the reaction mixture, separating ammonium nitrate thus produced from the residual gas, removing from the circulatory system heat liberated by the reaction, and adjusting the nitrogen tetroxide, oxygen and water vapor content of the recirculating gas prior to admixing ammonia therewith.

22. The process for the production of ammonium nitrate which comprises circulating a gas containing nitrogen tetroxide, oxygen and water vapor in a circulatory system and during the circulation of said gas admixing therewith ammonia whereby ammonium nitrate is produced, limiting the quantity of said ammonia to an amount less than about 0.3 times that required to neutralize all the nitrogen tetroxide in the reaction mixture, separating ammonium nitrate thus produced from the residual gas, bleeding from the circulatory system a portion of the gas therein, admitting to said system additional quantities of gas containing nitrogen tetroxide and oxygen, cooling the circulating gas and adjusting its content of water vapor prior to admixing the ammonia therewith and so correlating the aforesaid steps of the process as to maintain substantially 23. The process for the production of ammonium nitrate which comprises circulating a gas containing nitrogen tetroxide, oxygen and water vapor in a circulatory system and during the circulation of said gas admixing therewith ammonia whereby ammonium nitrate is produced, limiting the quantity of said ammonia to an amount less than about 0.3 times that required to neutralize all the nitrogen tetroxide in the reaction mixture, separating ammonium nitrate thus produced from the residual gas, bleeding from the circulatory system a portion of the gas therein, admitting to said system additional quantities of gas containing nitrogen tetroxide and oxygen, cooling the circulating gas and adjusting its content of water vapor prior to admixing the ammonia therewith by directly contacting said gas with an aqueous solution of nitric acid prior to admixing the ammonia therewith, and maintaining the temperature of the reaction mixture of ammonia and said circulating gas below about 125° C.

24. The process for the production of ammonium nitrate which comprises circulating a gas containing nitrogen tetroxide, oxygen and water vapor in a circulatory system and during the circulation of said gas admixing therewith ammonia whereby ammonium nitrate is produced, limiting the quantity of said ammonia to an amount between about 0.1 and 0.25 times that required to neutralize all the nitrogen tetroxide in the reaction mixture, separating ammonium nitrate thus produced from the residual gas, bleeding from the circulator system a portion of the gases therein, admitting to said system additional quantities of gas containing nitrogen tetroxide and oxygen, cooling the circulating gas and adjusting its content of water vapor by directly contacting it with an aqueous solution of nitric acid containing about 50% nitric acid at a temperature of about 40° C., and maintaining the temperature of the reaction mixture of ammonia and said cooled gas below about 125° C.

25. The process of producing ammonium nitrate which comprises admixing successive additions of ammonia with a gas containing nitrogen tetroxide, oxygen and water vapor, limiting the quantity of each addition of ammonia to an amount insufficient to completely neutralize the nitrogen tetroxide in the gas admixed therewith, and maintaining the temperature of the reaction mixture below about 125° C.

26. The process of producing ammonium nitrate which comprises admixing successive additions of ammonia with a gas containing nitrogen tetroxide, oxygen and water vapor, limiting the quantity of each addition of ammonia to an amount less than about 0.25 times that required to completely neutralize the nitrogen tetroxide in the gas admixed therewith, and maintaining the temperature of the reaction mixture below about 125° C.

27. The process of producing ammonium nitrate which comprises admixing successive additions of ammonia with a gas containing nitrogen tetroxide, oxygen and water vapor, limiting the quantity of each addition of ammonia to an amount insufficient to completely neutralize the nitrogen tetroxide in the gas admixed therewith, maintaining the temperature of the reaction mixture below about 125° C. and intermediate the introduction of two of said additions of ammonia maintaining the gas containing ammonium nitrate for a period of time in a relatively quiescent condition.

28. The process for the production of ammonium nitrate which comprises recirculating a gas containing nitrogen tetroxide, oxygen and water vapor in a circulatory system and during the circulation of said gas admixing therewith successive additions of ammonia to produce ammonium nitrate, separating the residual gas and ammonium nitrate, adding to the residual gas nitrogen tetroxide and oxygen, adjusting the temperature and water vapor content of the circulating gas prior to the addition thereto of ammonia, continuously withdrawing from the aforesaid circulatory system a portion of the gas circulating therein, passing the withdrawn gas into a second circulatory system wherein it is recirculated and during its circulation in said second system mixing said gas with successive additions of ammonia to produce additional ammonium nitrate, separating the residual gas and ammonium nitrate thus produced, adding to the residual gas the gas withdrawn from the first mentioned circulatory system, and adjusting the temperature and water vapor content of the circulating gas, and in both of the aforesaid circulating systems limiting the amount of each of said additions of ammonia admixed with the circulating gas to not more than 0.3 times that required to neutralize all the nitrogen tetroxide present in the reaction mixture and maintaining the reaction mixture at a temperature below about 125° C.

29. The process for the production of ammonium nitrate which comprises recirculating a gas containing nitrogen tetroxide, oxygen and water vapor in a circulatory system and during the circulation of said gas admixing therewith successive additions of ammonia to produce ammonium nitrate, maintaining the reaction mixture at a temperature below about 125° C., separating the residual gas and ammonium nitrate, adding to the residual gas nitrogen tetroxide and oxygen, adjusting the temperature and water vapor content of the circulating gas prior to the addition thereto of ammonia, by directly contacting said gas with an aqueous solution of nitric acid at a temperature of about 40° C., continuously withdrawing from the aforesaid circulatory system a portion of the gas circulating therein, passing the withdrawn gas into a second circulatory system wherein it is circulated and during its circulation in said second system mixing said gas with successive additions of ammonia to produce additional ammonium nitrate, maintaining the reaction mixture at a temperature below about 125° C., separating the residual gas and ammonium nitrate thus produced, adding to the residual gas the gas withdrawn from the first mentioned circulatory system, and adjusting the temperature and water vapor content of the circulating gas by directly contacting said gas with an aqueous solution of nitric acid at a temperature of about 40° C.

30. The process of producing ammonium nitrate which comprises admixing ammonia in a plurality of stages with a gas comprising nitrogen tetroxide, water vapor and a quantity of oxygen not greater than about 10% of the total volume of said gas, limiting the quantity of ammonia available for reaction with the nitrogen tetroxide in each stage to not more than about 0.3 times the amount required to neutralize all of said nitrogen tetroxide to form ammonium nitrate, and maintaining the reaction mixture in each of said stages at a temperature below about 125° C.

31. The process for the production of ammonium nitrate which comprises mixing ammonia with a gas containing nitrogen tetroxide, oxygen and water vapor, said water vapor being in amount in excess of that required to react with all the nitrogen tetroxide but insufficient to form a liquid condensate in the aforesaid gas at temperatures above about 40° C. and maintaining the reacting mixture of ammonia and said gas at temperatures within the range of about 40° C. to 125° C.

32. The process for the production of ammonium nitrate which comprises mixing ammonia, nitrogen tetroxide, oxygen and water vapor in the proportions of less than 0.3 parts of ammonia, 1 part of nitrogen tetroxide, and from 0.5 to 2.5 parts of water vapor.

33. The process for the production of ammonium nitrate which comprises mixing ammonia, nitrogen tetroxide, oxygen and water vapor in the proportions of not more than about 0.3 parts of ammonia, about 1 part of nitrogen tetroxide and between about 0.5 and 2.5 parts of water vapor and maintaining the temperature of the reacting gases between about 40° C. and 125° C.

34. The process of producing ammonium nitrate which comprises introducing successive additions of ammonia into a gas containing nitrogen tetroxide, oxygen and water vapor, said gas containing about 0.5 to 2.5 parts of water vapor to every 1 part of nitrogen tetroxide, limiting the quantity of each addition of ammonia to an amount less than about 0.25 times that required to completely neutralize all of the nitrogen tetroxide in the gas into which said addition is introduced, separating ammonium nitrate formed from the residual gas, cooling the gas prior to the addition of ammonia thereto by directly contacting it with an aqueous nitric acid solution at a temperature of about 40° C., and maintaining the temperature of the reaction mixture formed by each of said additions of ammonia below about 125° C.

35. The process of producing ammonium nitrate which comprises introducing a concentrated ammonia gas into a mixture of nitrogen oxides, oxygen and water vapor in which 80% or more of the nitrogen oxides are present as nitrogen tetroxide and limiting the quantity of ammonia to not more than 0.3 times the amount required to neutralize all of the nitrogen tetroxide to form ammonium nitrate.

36. The process of producing ammonium nitrate which comprises introducing a concentrated ammonia gas into a mixture containing nitrogen tetroxide, oxygen and water vapor, limiting the quantity of ammonia added to an amount insufficient to neutralize all the nitrogen tetroxide contained in said gas mixture to form ammonium nitrate, and maintaining said mixture throughout the course of the reaction at a temperature below about 125° C.

37. The process for the production of ammonium nitrate which comprises recirculating a gas containing nitrogen oxides, oxygen and water vapor in a circulatory system, introducing a concentrated ammonia gas into the circulating gases in amount less than about 0.25 times that required to neutralize all of the nitrogen tetroxide in the gas admixed therewith, maintaining the temperature of the reaction mixture below about 125° C., separating from the residual gas the ammonium nitrate thus formed, and prior to recirculation of the residual gas for introduction thereinto of ammonia, replacing the nitrogen oxides and oxygen removed from the gas in the formation of ammonium nitrate, and cooling the gas to a temperature of about 40° C. and adjusting the water vapor content by direct contact of said gas with aqueous nitric acid.

38. The process of producing ammonium nitrate which comprises introducing ammonia into a gas containing oxygen, water vapor and not more than about 6% nitrogen tetroxide and limiting the quantity of ammonia to an amount less than about 0.25 times that required to neutralize all the nitrogen tetroxide to form ammonium nitrate.

39. The process of producing ammonium nitrate which comprises passing a gas containing not more than about 6.5% nitrogen tetroxide and oxygen into direct contact with an aqueous solution of nitric acid containing about 50% $HNO_3$ at about 40° C., introducing ammonia into the thus treated gas in amount insufficient to neutralize all the nitrogen tetroxide contained therein to form ammonium nitrate, and maintaining the reacting mixture of gases at a temperature below about 125° C.

40. The process of producing ammonium nitrate which comprises passing a gas containing not more than about 6% nitrogen tetroxide and oxygen into direct contact with an aqueous solution of nitric acid containing about 50% $HNO_3$ at about 40° C., introducing ammonia into the thus treated gas in amount less than about 0.25 times that required to neutralize all the nitrogen tetroxide contained therein, maintaining the reacting mixture of gases at a temperature below about 125° C., separating the ammonium nitrate thus formed from the residual gases, and reacting the residual gas with an additional quantity of ammonia under substantially the same conditions as hereinbefore described for the first mentioned gas containing nitrogen tetroxide and oxygen.

41. In the process of producing ammonium nitrate by reaction in the gaseous phase of ammonia, water, nitrogen tetroxide and oxygen, that improvement which comprises introducing ammonia into a stream of gas containing nitrogen tetroxide, oxygen and water vapor while mechanically imparting a turbulence to said stream of gas.

42. In the process of producing ammonium nitrate by reaction in the gaseous phase of ammonia, water, nitrogen tetroxide and oxygen, that improvement which comprises introducing a restricted flowing stream of concentrated ammonia gas into a flowing stream of gas containing nitrogen tetroxide, oxygen and water vapor while mechanically imparting a turbulence to said last mentioned stream of gas.

43. In the process of producing ammonium nitrate by reaction in the gaseous phase of ammonia, water, nitrogen tetroxide and oxygen, that improvement which comprises introducing a stream of concentrated ammonia gas flowing at high velocity into a stream of gas containing nitrogen tetroxide, oxygen and water vapor while mechanically imparting a turbulence to said last mentioned stream of gas.

44. The process of producing ammonium nitrate which comprises preparing a mixture of nitrogen tetroxide, oxygen and water vapor having a temperature of about 40° C., introducing ammonia into a turbulent stream of said gas, limiting the quantity of ammonia thus introduced to an amount not greater than about 0.3 times the amount required to neutralize all of the nitrogen tetroxide, and maintaining the temperature of the reacting mixture of gases below about 125° C.

45. The process of producing ammonium nitrate which comprises circulating a gas containing nitrogen tetroxide, oxygen and water vapor in a circulatory system and in said system introducing a concentrated ammonia gas into a turbulent stream of said gas in amount less than about 0.25 times the amount required to neutralize all of the nitrogen tetroxide in the gas, separating ammonium nitrate thus formed from the residual gases, introducing nitrogen tetroxide and oxygen into the residual gas in amount such that the resulting gas mixture contains not more than about 6% nitrogen tetroxide and directly contacting said gas mixture with an aqueous solution of nitric acid containing about 50% HNO$_3$ at a temperature of about 40° C. prior to the introduction thereto of ammonia gas as hereinbefore described.

46. The process of producing ammonium nitrate which comprises circulating a gas containing nitrogen tetroxide, oxygen and water vapor in a circulatory system and in said system introducing a concentrated ammonia gas into a turbulent stream of said gas in amount between about 0.1 to 0.25 times the amount required to neutralize all of the nitrogen tetroxide in the gas, separating ammonium nitrate thus formed from the residual gases, removing from the system a portion of the residual gas, introducing nitrogen tetroxide and oxygen into the residual gas remaining in said system, in amount such that the resulting gas mixture contains about 5% to 6% nitrogen tetroxide, directly contacting said gas mixture with an aqueous solution of nitric acid containing about 50% HNO$_3$ at a temperature of about 40° C. prior to the introduction thereto of ammonia gas as hereinbefore described, introducing the residual gas removed from the aforesaid circulatory system into a second circulatory system, mixing said gas with a gas containing nitrogen tetroxide, oxygen and water vapor circulated therein, directly contacting the mixed gases with an aqueous solution of nitric acid containing about 50% HNO$_3$ at a temperature of about 40° C., introducing a concentrated ammonia gas into a turbulent stream of the thus treated mixed gas in amount between about 0.1 and 0.25 times the amount required to neutralize all of the nitrogen tetroxide in the gas, maintaining the thus treated gas for a period of time in a relatively quiescent condition, introducing a further quantity of a concentrated ammonia gas into a turbulent stream of the thus treated gas in amount between about 0.1 and 0.25 times the amount required to neutralize all of the nitrogen tetroxide in the gas, separating the ammonium nitrate thus formed from the residual gas, withdrawing from the second circulatory system a portion of said residual gas, and mixing the residual gas containing nitrogen tetroxide, oxygen and water vapor remaining in said system with the gas withdrawn from the first mentioned circulatory system as hereinbefore described.

47. An apparatus for the production of ammonium nitrate by reaction of ammonia, water vapor, nitrogen tetroxide and oxygen, comprising a closed circulatory system, said system comprising in combination a gas cooler, a reaction vessel and a separator for removing a solid from a gas in which it is suspended all connected by conduits for circulation of gas therethrough, means for introducing gaseous reactants into said system, said means comprising means for introducing into said reaction vessel at least one of the gaseous reactants separate from the others, means for recirculating gas introduced into the system in series through said cooler, reaction vessel and separating means, and a second closed circulatory system comprising in combination a gas cooler, a reaction vessel and a separator for removing a solid from a gas in which it is suspended, means for withdrawing a portion of the gas circulating in the first mentioned circulatory system and introducing it into the second circulatory system, means for introducing gas into the last mentioned reaction vessel, and means for recirculating gas introduced into said second system in series through the cooler, reaction vessel and separator of said system.

HERMAN ALBERT BEEKHUIS, Jr.